Patented June 8, 1943

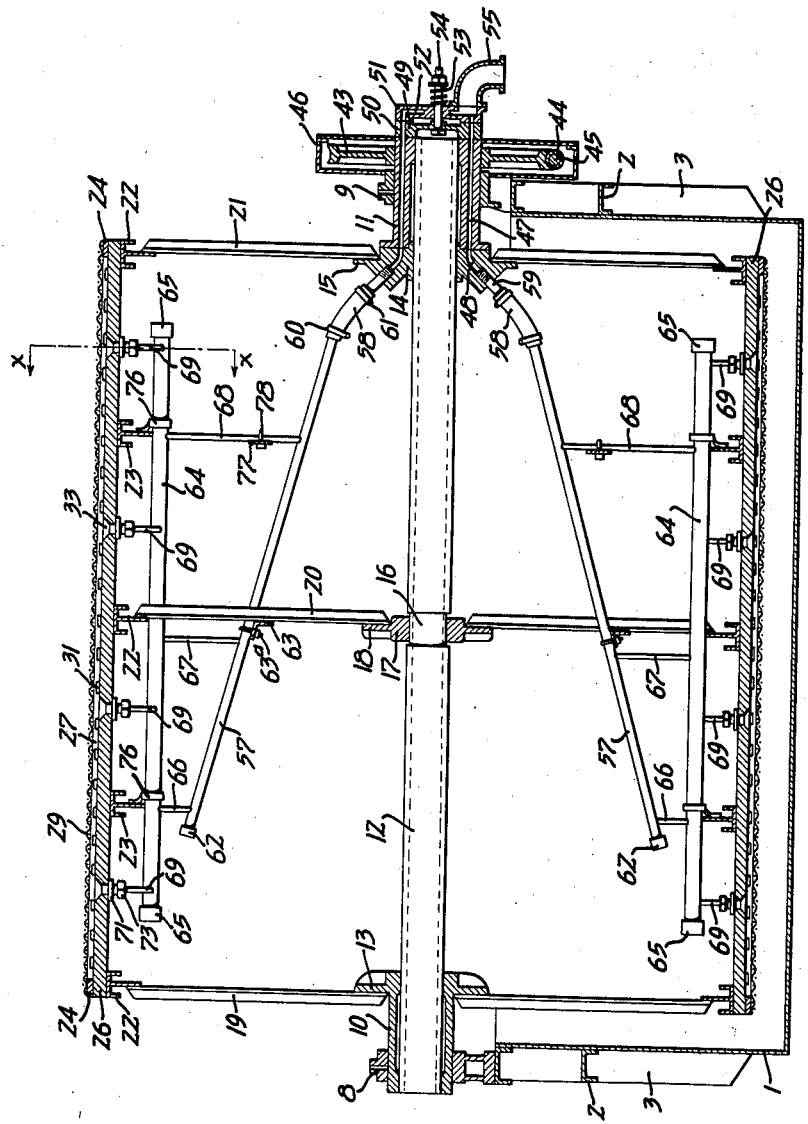

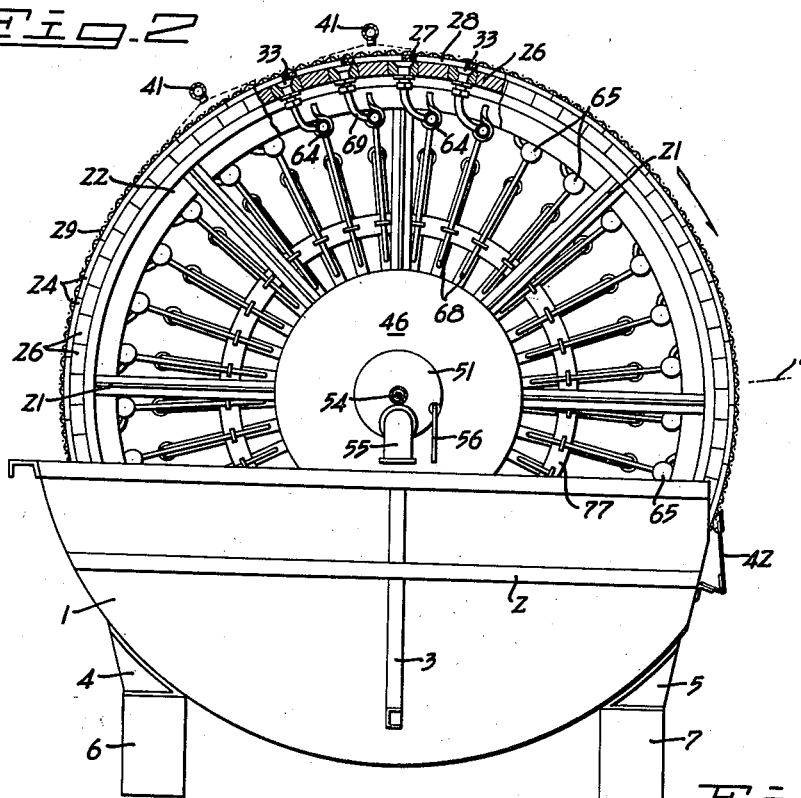

2,321,230

UNITED STATES PATENT OFFICE 2,321,230

ROTARY VACUUM FILTER

Arnold Mills and Herbert A. Rodgers,
Lonely Mine, Southern Rhodesia

Application July 8, 1940, Serial No. 344,400
In the Union of South Africa July 7, 1939

5 Claims. (Cl. 210—202)

(Granted under the provisions of sec. 14, act of
March 2, 1927; 357 O. G. 5)

This invention consists of improvements in rotary vacuum filters. It is more particularly suitable for those filters used for separating or extracting gold or other precious metal-bearing solvent solutions from finely reduced ore pulp or metallurgical slime.

In rotary vacuum filters as at present ordinarily constructed communication is established between the manifold or main vacuum or suction and discharge or compressed air pipe for each section or compartment of the filter, and said section or compartment by means of branch pipes which directly connect the manifold with the compartment. This results in a certain amount of solution, containing dissolved precious metal values, which is in the main and branch pipes when the section or compartment reaches the point of discharge, being blown or forced out through the filtering medium by the compressed air used to discharge or dislodge the filter cake and going with the latter to waste.

Now the object of the present invention is to provide means which will prevent such waste of solution and consequent loss of the precious metal values therein contained.

According to the invention we operatively arrange between the manifold or main pipe for each compartment and such compartment one or a plurality of vessels, headers or traps into and from which the filtrate is drawn by the suction means, and into which, when the suction is cut off, solution or liquid present in the main and branch pipes flows by gravity or is blown or forced by the compressed air, and in which it is retained until the suction means again operates. The cross-sectional area of the vessel, header or trap is considerably larger than that of the pipe or pipes leading into it, so that the velocity of the air entering it will be momentarily reduced, which will permit of the deposition in the vessel or trap of the liquid or solution blown or forced thereinto by the compressed air. The pipes from the manifold to the vessel will be out of line with those from the latter to the compartment and preferably at some distance from them longitudinally, and/or suitable baffles will be provided in the vessel, header or trap so that the entering air will impinge on the wall thereof, or the baffles therein, and be prevented in this way from passing directly therethrough and carrying the liquid or solution with it.

In carrying out the invention in one form we employ for each section or compartment of the filter a header or pipe of larger diameter than the manifold or main pipe or conduit for such compartment or section, and operatively arrange the same between the branch pipes from the manifold and further short branch pipes which open into or directly communicate with the compartment or section. The connections between the manifold branch pipes and the header, and the further short branch pipes and the header are made at some distance from each other and preferably staggered along the length of the header or pipe so as to be as far away from one another as possible. The short pipes establishing communication between the header and the section or compartment may be curved or in the form of bends and open into the section or compartment at some distance behind the header relative to the direction of rotation of the filter, or at the trailing side of the header, so that gravity will act to return some or all of the solution contained in the compartment and said branch pipes to the header when the vacuum is cut off and before the compressed air is applied to blow off or loosen the filter cake.

In another embodiment of the invention we provide in each of the branch pipes connecting the manifold with the compartment, or construct it with, a vessel or enlargement forming a chamber which constitutes a trap in which the solution or liquid in the pipes at the time of discharge will be retained. The chamber may be provided interiorly with one or a series of baffles or their equivalent and/or have the two pipes or parts of the branch pipe opening into it at some distance from one another, or out of line.

The invention possesses other advantageous features, some of which with the foregoing will be set forth at length in the following description where those forms of the invention which have been selected for illustration in the drawings accompanying and forming a part of the present specification are outlined in full. In said drawings, two forms of the invention are shown, but it is to be understood that it is not limited to such form, since the invention as set forth in the claims may be embodied in a plurality of forms.

The invention will be more fully explained with the aid of the accompanying drawings, wherein Figure 1 is a central section through the filter.

Figure 2 is a part-sectional end elevation of a rotary vacuum filter incorporating the invention in one form, the plane of section being indicated by the dotted line x—x in Figure 1.

Figure 3 is a view drawn to an enlarged scale, showing one of the headers and its connection with the corresponding section or compartment of the filter.

Figure 4 is a view taken at right angles to Figure 3.

Figure 5 is a part-sectional elevation of another embodiment of the invention, and Figure 6 is a sectional plan of Figure 5 on line y—y.

Referring now to Figures 1 to 4 of the drawings, the numeral 1 denotes the filter tank or receptacle in which the metallurgical slime or ore pulp is placed and from which it is drawn by the filter. The tank 1 is shown stayed or stiffened by horizontal and vertical channel iron girders 2, 3, respectively and carried through the medium of feet or brackets 4, 5, on supports 6, 7, respectively. Upon the girders 2 at the top of the tank 1 are arranged bearings 8, 9, in which are rotatably mounted the rear and front or drive trunnions 10, 11, respectively, of the filter. The trunnions 10, 11, are of hollow construction and are fixed upon a central hollow supporting shaft 12 at the requisite distance apart.

The rear trunnion 10 is constructed with a flange 13, near its inner end, and to the front trunnion 11, around the shaft 12, is fixed an annular member 14 having a flange 15. Centrally of the length of the shaft 12 in an annular recess 16 formed therein is arranged and fixed a further annular member 17 constructed in halves fixed together and having a flange 18. To the flanges 13, 15 and 18 are fixed the arms or spokes 19, 20, 21 respectively, of the framework of the rotary filter drum. The arms or spokes 19, 20, 21, are of T shape in cross-section and are fixed at their outer ends to the inwardly projecting central webs of annular members 22 of T shape in cross-section having inwardly projecting outer webs. Centrally between each of the outer members 22 and the center member 22 are arranged further similar annular members 23. The annular members 22, 23, support the parts providing the several hollow filter sections or compartments and carrying the filtering medium.

Upon the annular members 22, 23, are arranged and fixed the longitudinal wooden staves or pieces of timber 26 which form the bottoms of the filter compartments and carry the filter medium supporting means. Upon the staves 26 (see more particularly Figures 3 and 4) are arranged and fixed the longitudinal division or partition strips 27 which divide or separate the various filter compartments, and between said strips 27 are placed and secured the wooden grating or screens 28 for supporting the filtering medium or outer porous surface 29 of the filter. Strips 24 close the ends of the compartments.

The division strips 27 are shown constructed with inner longitudinal grooves 30, inner transverse slots 31 on one side leading to said grooves 30, and outer draining grooves 32. These strips 27, as shown in Figure 4, are so arranged relative to the vacuum pipe inlet funnels 33, hereinafter described, that they make contact along their whole length with the staves 26 on one side, as indicated at 34, and so operatively separate the compartments. On the other side they allow of the free flow of the filtrate to the funnels 33. A longitudinal groove 35 is formed in the top of each strip 27 beyond the draining grooves 32, in which the filtering medium is held by a piece of wire 36.

The grating or screen 28 for supporting the filtering medium 29 between the division strips 27, is shown constructed with intermittent longitudinal grooves 37 on the inside, deeper spaced transverse or circumferential grooves or spaces 38 intersecting said grooves 37 at intervals, and smaller longitudinal slots 39 opening from the outside into said grooves 38. The porous filtering medium 29 is arranged and secured on the ribs 40 formed between the slots 39, so that free passage is provided for filtrate drawn or sucked through the filtering medium 29 to the suction inlet funnels 33, and for compressed air forced through said funnels 33 to dislodge the filter cake from the filtering medium 29.

The means for connecting the various parts of the framework to each other, the staves 26 to said framework, and fixing the filtering medium 29 and its supporting means in position are omitted for the sake of clearness.

41 are water pipes fitted with spraying means for applying wash water or solution to the filter cake during the operation of the filter. 42 is a hinged scraper provided for removing or deflecting the filter cake after it has been loosened or dislodged by the compressed air discharge means.

The means through which the rotary motion is transmitted to the filter drum include a worm wheel 43 fixed on the drive trunnion 11, and a worm 44 engaging said worm wheel 43; 45 being the worm shaft to which motion is transmitted by suitable driving means, not shown. 46 is a casing enclosing the worm gear 43, 44.

The drive trunnion 11 and member 14 have coincident longitudinal holes or passages 47, 48, respectively, formed therein, one for each section or compartment of the filter, with which cooperate an automatic valve 49. The valve 49 is composed of two main parts, i. e., a perforated wearing plate 50, providing the valve seat, which is fixed to the drive trunnion 11, and a stationary part 51 providing the valve chamber 52. The stationary part 51 is maintained in close working contact with the rotating plate 50 by a spring 53 arranged around a bolt 54 which passes through the plate 50 and part 51. 55 is the suction pipe to the valve 49, which is fixed to part 51 and communicates with the valve chamber 52. 56 (see Figure 2) is the pipe for introducing the compressed air through the valve 49 to dislodge or discharge the filter cake. The valve chamber 52 is so constructed that when the filter is rotating the suction pipe 55 is shut off from the sections or compartments successively at a predetermined short time before the section or compartment from which the filter cake is to be discharged is placed in communication with the compressed air pipe 56, and opened again to said sections or compartments at a predetermined short time after the compressed air pipe 56 has been closed thereto.

57 are the main suction and discharge pipes or manifolds within the filter drum. They are connected by means of pieces of flexible pipe 58 to nipples 59 screwed into the curved holes or passages 48 in the member 14. 60, 61 are clamps fixing the flexible pipes 58 to the manifolds 57 and nipples 59, respectively. The manifolds 57 are closed at their outer ends by screwed caps 62 and are shown supported in the filter drum by an angle iron ring 63 fixed to the central arms or spokes 20. 63ª are U-bolts which serve for fixing the manifolds 57 to the ring 63.

The means according to the invention shown for trapping or retaining the solution or liquid present in each of the manifolds 57 and its connections with the sections or compartments of the filter, when the suction is cut off, includes a pipe or header 64 of larger diameter than the manifold 57, closed at both ends by screwed caps 65. The headers 64 are shown placed in communication with the manifolds or main pipes 57 by branch pipes 66, 67, 68, and connection between said headers 64 and the interiors of the respective sections or compartments is made by means of four curved branch pipes or bends 69 which open into the suction inlet funnels 33. The points of connection of the curved branches or bends 69 with the headers 64 are staggered in relation to those of the branches 66, 67, 68, so that when solution or liquid is blown or forced from the manifold 57 and said latter branches by the compressed air for discharging the filter cake, it impinges on the interior wall of the header 64 and is deposited in said header 64.

The curved branch pipes 69 are so arranged relative to the headers 64 that they project to the rear or trailing side of the latter and then extend outwardly radially to make connection with the funnels 33. This arrangement of the curved branches 69 ensures that solution or liquid in them or in the sections or compartments at the point of removal of the suction (at or about the position indicated by the dotted line 70 in Figure 2) will flow back by gravity into the header or trap 64 until the compressed air is admitted by the valve 49 to discharge or blow off the filter cake.

The funnels 33 are each screw-threaded externally and fixed in position in the stave 26 by means of a nut 71. 72 are lugs or dogs on the exterior of the funnel 33 which enter the stave 26 when the funnel is arranged therein and prevent rotation of the latter, when the nut 71 and gland nut 73, about to be described, are tightened. The funnels 33 at their outer ends are coned interiorly and are of such a size internally at their inner ends as to receive the reduced outer ends of the curved branch pipes 69. A gland nut 73 is arranged around the end of each branch 69, and a coned washer therein, indicated by the numeral 74, acts to compress a rubber packing ring 75 within the gland nut 73 between it and the coned end of the funnel 33, and make a fluid-tight joint and connection around the end of the branch pipe 69.

The headers 64 are supported in position against the inner annular members 22, 23 of the drum frame by brackets 76 embracing the headers 64 and fixed to said members 22, 23. 77 is a flat iron ring stay to which the branch pipes 68 are attached by U-bolts 78.

The manner in which the means for receiving and retaining the liquid or solution in the various pipes and passages at the time when the suction is cut off will have been understood from the foregoing, but may be briefly described as follows, with reference to one longitudinal section or compartment of the filter: After the filter cake has been picked up in the tank or receiver 1 by the suction or vacuum means, and has thereafter during the rotation of the drum been subjected by suction to drying and, if desired, to washing by solution and/or clean water, and a further drying, it reaches the point where the suction or vacuum is cut off. Solution or liquid in the compartment and curved branch pipes 69 now flows by gravity to the header 64, and upon the compressed air being introduced to blow off, discharge or loosen the filter cake, the solution or liquid present in the passages 47, 48, nipple 59, flexible pipe 58, manifold 57 and branches 66, 67, and 68, is blown or forced into the header 64, and, owing to the large diameter of the latter is deposited therein due to the velocity of the air being momentarily reduced. The air then passes by way of the curved branch pipes 69 to the section or compartment and dislodges the filter cake. After discharge and upon suction or vacuum being established, the liquid in the header 64 is removed by suction together with the filtrate.

In the embodiment of the invention illustrated in Figures 5 and 6 of the drawings, we show a vessel or trap 80 adapted to be interposed between and joined to branch pipes 81, 82, connected respectively to the manifold and the section or compartment and to establish communication between them through the vessel or trap 80. The vessel or trap 80 is in the form of a cylinder having end plates 83, 84 welded thereto. The branch pipe 81 is shown welded to the outside of end plate 84 at one side of the vessel 80, and the other branch pipe 82 is shown welded to the outside of the end plate 83 at the other side of the vessel 80, so that the orifices of said pipes 81, 82 are not opposite each other. In front of the orifice of pipe 81 a baffle plate 85 is arranged and secured, and in front of the orifice of pipe 82 a further baffle plate 86 is fixed. The baffles 85, 86, leave large openings 87, 88, respectively, between them and the wall of the vessel, the opening 87 being at the opposite side of the vessel 80 to the opening 88. At their other sides the plates 85, 86, provide small openings 89, 90, between them and the wall of the vessel 80. The branch pipe 82 is reduced at its outer end, at 91, to make connection with the suction inlet funnel. In operation, on the suction being cut off the solution or liquid blown from the manifold and branch pipe 81 into the vessel or trap 80 impinges on the baffle 85, and, due to momentary decrease in air velocity, is deposited in the vessel 80. Any liquid flowing back through pipe 82 will also be retained in the vessel 80 until suction is resumed.

We claim:

1. In a continuous rotary drum filter wherein the filter drum is provided with a filtrate compartment arranged to rotate through a body of material to be filtered and with an automatic valve for subjecting said filtrate compartment to a differential filtering pressure and to a reverse blow back pressure, means for establishing communication between said compartment and said valve comprising: a conduit communicating with the leading edge of said compartment and extending inwardly over a portion of its length toward the axis of said drum and then forwardly over a further portion of its length to a point in angular advance of the leading edge of said compartment.

2. In a continuous rotary drum filter wherein the filter drum is provided with a filtrate compartment arranged to rotate through a body of material to be filtered and with an automatic valve for subjecting said filtrate compartment to a differential filtering pressure and to a reverse blow back pressure: a conduit disposed within said drum in parallelism with its axis and in angular advance of the leading edge of said drum; an elbow establishing communication between the leading edge of said compartment and said conduit; and means for establishing communication between said conduit and said automatic valve.

3. In a continuous rotary drum filter wherein the filter drum is provided on its surface with a filtrate compartment defined in part by a pair of spaced longitudinally disposed division strips secured to said drum and with an automatic valve associated with one of the drum trunnions for subjecting said filtrate compartment to a differential filtering pressure and to a reverse blow back pressure, means for establishing communication between said compartment and said valve comprising: a conduit communicating at its outer end only with the leading edge of said compartment adjacent the leading division strip defining said compartment, said leading division strip being provided with a portion overhanging the outer end of said conduit and forming a pocket for the reception of liquor when said compartment is on the descending side of said drum.

4. In a continuous rotary drum filter wherein the filter drum is provided with a filtering compartment arranged to rotate through a body of material to be filtered, and with an automatic valve associated with one of the drum trunnions for subjecting said compartment to a differential filtering pressure, and to a reverse blow-back pressure, means for establishing communication between said compartment and said automatic valve comprising: an elbow communicating at its outer end with the leading edge of said compartment, and at its inner end with a drainage chamber, the inner leg of said elbow extending forwardly in the direction of rotation of said drum; and a conduit communicating at its outer end with said chamber, and at its inner end with said automatic valve, the cross sectional area of said chamber being greater than the cross sectional area of either said elbow or said conduit.

5. In a continuous rotary drum filter wherein the filter drum is provided on its surface with a pair of spaced longitudinally disposed division strips secured to said drum and defining therewith a filtrate compartment, and with an automatic valve associated with one of the drum trunnions for subjecting said filtrate compartment to a differential filtering pressure and to a reverse blow back pressure; means for establishing communication between said compartment and said valve comprising: a manifold disposed within said drum in parallelism with the drum axis and in angular advance of the leading edge of said section; a plurality of spaced elbows each communicating at its outer end with the leading edge of said compartment and at its inner end with said manifold; and a conduit communicating at its outer end with said manifold and at its inner end with said valve, the cross-sectional area of said manifold being greater than the cross-sectional area of any one of said elbows.

ARNOLD MILLS.
HERBERT A. RODGERS.